(12) United States Patent
Herrmann

(10) Patent No.: US 6,800,959 B2
(45) Date of Patent: Oct. 5, 2004

(54) METHOD AND DEVICE FOR THE AUTOMATIC CONTROL OF ILLUMINATION DEVICES

(75) Inventor: Wolfgang Herrmann, Freising (DE)

(73) Assignee: Robert Bosch GmbH, Stuttgart (DE)

( * ) Notice: Subject to any disclaimer, the term of this patent is extended or adjusted under 35 U.S.C. 154(b) by 180 days.

(21) Appl. No.: 10/111,471

(22) PCT Filed: Jun. 7, 2001

(86) PCT No.: PCT/DE01/02142

§ 371 (c)(1),
(2), (4) Date: Jul. 26, 2002

(87) PCT Pub. No.: WO02/16167

PCT Pub. Date: Feb. 28, 2002

(65) Prior Publication Data

US 2003/0048001 A1 Mar. 13, 2003

(30) Foreign Application Priority Data

Aug. 24, 2000 (DE) .......................... 100 41 674

(51) Int. Cl.[7] ................................................ H02G 3/00
(52) U.S. Cl. ..................................................... 307/10.1
(58) Field of Search ................................ 307/9.1, 10.1,
307/10.8; 318/444, 483, DIG. 2

(56) References Cited

U.S. PATENT DOCUMENTS

| 4,916,374 A | | 4/1990 | Schierbeek |
| 4,956,591 A | * | 9/1990 | Schierbeek et al. .......... 318/483 |
| 5,436,541 A | | 7/1995 | Mangler |
| 5,923,027 A | * | 7/1999 | Stam et al. ............... 250/208.1 |
| 6,084,519 A | * | 7/2000 | Coulling et al. ............. 340/602 |
| 6,681,163 B2 | * | 1/2004 | Stam et al. .................... 701/36 |

FOREIGN PATENT DOCUMENTS

| DE | 195 23 262 | 1/1997 |
| EP | 0 537 471 | 4/1993 |
| EP | 0 682 611 | 11/1995 |
| JP | 06 328 998 | 11/1994 |
| WO | WO 01 05626 | 1/2001 |

* cited by examiner

Primary Examiner—Adolf Berhane
(74) Attorney, Agent, or Firm—Kenyon & Kenyon

(57) ABSTRACT

A method and a device are proposed for the automatic control of illumination devices (24), having a control element (22) which acts on illumination devices (24) and which is calibrated at time intervals (T), for which various calibration parameters are taken into account.

13 Claims, 1 Drawing Sheet

METHOD AND DEVICE FOR THE AUTOMATIC CONTROL OF ILLUMINATION DEVICES

BACKGROUND INFORMATION

The present invention relates to a method and a device for the automatic control of illumination devices, particularly of a motor vehicle, according to the species defined in the independent claims. Such methods are already known—for example, from the German Patent 195 23 262—but they describe only how the external illumination devices are controllable on the basis of an absolutely incident quantity of light. However, an unwanted change in the control characteristic results due to various aging effects.

SUMMARY OF THE INVENTION

The method of the present invention having the features of the main claim has the advantage that the control element, which acts on the illumination devices, is calibrated at time intervals, thereby permitting compensation for aging effects of the optical media situated in the sensing region.

A further advantage is yielded if the calibration parameters of a rain sensor, which is likewise calibrated at time intervals, are relayed to the control element. The rain sensor and the control element for controlling illumination devices are frequently arranged in a single housing and have similar or even identical optical media. The result is that the aging process of both optical media proceeds in a similar or really identical manner.

The measures specified in the dependent claims yield advantageous further developments and improvements of the features indicated in the main claim.

It is advantageous if the rain sensor has a transmitter, a receiver and a light-conducting member; the receiver receives the light conducted through the light-conducting member from the transmitter and compares this signal to a setpoint value. In this way, the transmission properties are easily ascertainable, which means a simple calibration of the control element may be carried out.

A higher accuracy may be achieved if a transmittance is determined as result from the comparison of the received light signal to the setpoint value, and the control element is calibrated with the aid of this transmittance, since it is substantially responsible for the shift of the operating point of the control element.

If the control element has a second light-conducting member which is in correlation with the optical properties of the first light-conducting member, then this correlation may be taken into account in the calibration of the control element. In this way, the light-conducting member of the control element may be different from the light-conducting member of the rain-sensor device, in particular may be made of various plastics or glasses. Due to the correlation of the optical properties, the control element may still be calibrated exactly.

If the correlation is stored as a functional cohesion in the control element, any correlation as desired of the optical properties of the two light-conducting members may advantageously be taken into account in the calibration, provided they are able to be represented functionally.

If the calibration is carried out with the aid of a correlation stored as a table in the control element, storage and computing power of the control element are minimized. The calibration can then be carried out in a very simple manner without having to forfeit some of the flexibility of the correlation.

In addition, it is particularly advantageous to provide a calibration section over which a calibration parameter, which is taken into account during the calibration, is determined at time intervals (I).

A very simple calibration may also advantageously be performed, in that it is only carried out as a function of time. Particularly in the case of plastics, it is possible to proceed in this manner as a rough approximation of the transmission change, which means no further measuring distances are necessary.

A further beneficial calibration possibility is given if the calibration is a function of the brightnesses measured during the history of the control element. The optical properties of many plastics change as a function of time and the intensity of the light to which the plastics are exposed. If these variables are measured, with the aid of empirical values, it is possible to draw conclusions about the optical properties of the plastic.

Moreover, it is advantageous to in each case construct the light-conducting members and the electronics of the rain sensor and the control element in one piece in order to save installation space and reduce costs.

The device of the present invention having the features of claim 10 has the advantage that the control element is calibrated at time intervals. It is thereby possible to compensate for aging effects of the optical media, situated in the sensing region, or of the receivers. In this context, it is particularly advantageous if the calibration parameters of a rain sensor are usable for calibrating the control element.

It is particularly advantageous if the rain sensor has a transmitter, a receiver and a light-conducting member, and the receiver receives the light conducted from the transmitter through the light-conducting member, to in this way emit transmission-dependent signals. Transmission properties are ascertained in this manner, thereby allowing a calibration of the control element. If, moreover, the control element has a second light-conducting member whose optical properties are in correlation with the light-conducting member of the rain sensor, a simple and nevertheless precise calibration of the device advantageously results.

Due to the storage of the correlation in the control element as a functional cohesion, it is possible to store every correlation of the optical properties of the two subassemblies, rain sensor and control element, representable as function.

The correlation is advantageously also stored in the control element as a cohesion in table form, in order to permit a rapid calibration using as little computing expenditure as possible.

If the two light conductors of the rain sensor and of the control element are constructed in one piece, then a similar change in the optical properties results, since both are subject to the same exposure of sunlight. This is advantageous since the transmission properties of plastics are influenced substantially by the ultraviolet radiation to which they are subject during exposure to sunlight.

In addition, arranging the electronics of the control element and the electronics of the rain sensor in one piece on a single printed-circuit board saves costs and resources.

It is also advantageous if the control element is able to be calibrated at time intervals using a calibration parameter which is a function of the service life of the control element. Aging effects of the optical media, or even aging effects of the receiver elements, which typically are constructed as semiconductor components, are to a high degree time-dependent, which means the calibration on the basis of the service life represents a good first approximation.

It is also particularly advantageous to be able to calibrate the control element with the aid of a calibration parameter which is a function of the history of the control element. Since the aging of the control element is accelerated by high irradiating light intensities, the calibration may be carried out, for example, using a calibration parameter which is calibrated from the sum of the intensities that have previously fallen on the control element and been measured.

BRIEF DESCRIPTION OF THE DRAWING

Exemplary embodiments of the invention are shown in the drawing and are explained in greater detail in the following description.

DESCRIPTION OF THE EXEMPLARY EMBODIMENTS

Figure 1:
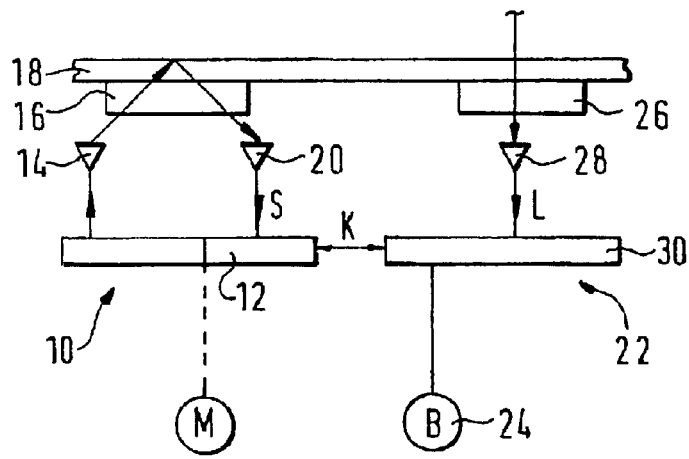
FIG. 1 shows a device of the present invention in schematic representation.

FIG. 1 shows a device of the present invention for the automatic control of illumination devices 24. It has a rain sensor 10 which is able to be calibrated by a calibration module 12.

Rain sensor 10 functions according to an optical total reflection method. A transmitter 14 sends light through a first light-conducting member 16 to a window 18, typically the windshield of a motor vehicle. The light penetrates window 18 and is totally reflected at the outside of window 18, facing away from first light-conducting member 16, at the glass-air interface, provided it is not wet from precipitation. The reflected light in turn travels from window 18 through first light-conducting member 16 to a receiver 20. This receiver 20 thereupon emits signals S, dependent on the light received, to calibration module 12.

To improve the ability to recognize precipitation on the outside of window 18, calibration module 12 performs a calibration in knowledge of the light emitted by transmitter 14.

Control element 22 is used for controlling illumination devices 24. The ambient light gets through window 18 and through second light-conducting member 26, arriving at a further receiver 28. It is connected to electronics 30 of control element 22 which evaluates its signals and, in dependence on them, controls illumination devices 24. To that end, stored in electronics 22 are so-called operating points which in each case correspond to a defined brightness. If the signal of further receiver 28 exceeds or falls below one or more of these operating points, illumination devices 24 are triggered, that is to say, are switched on or off or are dimmed.

First and second light-conducting members 16, 18 may naturally also be constructed in one piece. In the same way, electronics 30 of control element 22 may be disposed on the same board of calibration module 12, which may also fulfill still further functions.

Figure 2:
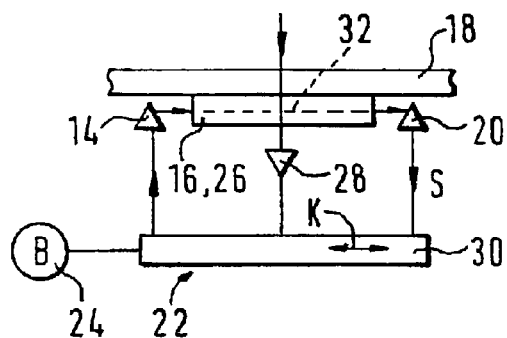
FIG. 2 shows a variation of the device according to the invention.

FIG. 2 shows a variation of a device according to the present invention. In this case, no rain sensor is used for the calibration, but rather a separate calibration section within control element 22. Light from transmitter 14 is transmitted through light-conducting members 16, 26 to receiver 20. In knowledge of the transmitted and received light, electronics 30 thereupon performs a calibration. This alters the operating points stored in electronics 30, or amplifies the signal emitted by further receiver 28.

In the following, the functioning of the device of the present invention, and thus also the method of the present invention, are clarified.

In a first step 40, rain sensor 10 is activated. Using its transmitter 14, it thereupon sends light of predetermined intensity in the direction of window 18, and sees to it that window 18 is clean, i.e. is free of dirt and precipitation. This may be accomplished, for example, in that the rain sensor drives wiper motor M, and thus carries out a reference wiping using washer fluid, if desired.

In a calibration step 42, the light which was totally reflected at window 18 is detected by receiver 20. It thereupon emits a signal S to calibration module 12 of rain sensor 10, the calibration module then carrying out a comparison to a setpoint value which may also be transmitter-dependent. Since at this moment, window 18 is free of precipitation and dirt, signal S is determined primarily by the transparency of window 18 and of first light-conducting member 16, respectively. Because as a rule, window 18 in motor vehicles is made of laminated glass, signal S represents first and foremost a measure for the transparency of first light-conducting member 16. In this way, upon each activation or at other time intervals, which need be neither constant nor predetermined, rain sensor 10 is able to be calibrated.

Calibration parameters K obtained during this calibration step 42 are utilized in a third step 44 by control element 22 to shift the operating points at which, if they are exceeded or not attained, illumination devices 24 are triggered. If, for example, the result ascertained in calibration step 42 yields a transmission of 95 percentage of the setpoint value 100 percentage, then the operating points may be lowered by approximately 5 percentage in the result in order to compensate for the effect of second light conductor 26. Since first light-conducting member 16 and second light-conducting member 26 may also be made of different materials which may exhibit different aging behavior as well, electronics 30 of control element 22 may also carry out a correction of the result. This correction is stored as correlation in electronics 30, and may be made of a simple factor, or also of a complex function.

In a fourth step 46, the device is activated, so that if the operating points of control element 22 are exceeded or not attained, illumination devices 24 are triggered.

The ambient light travels through window 18 and second light-conducting member 26 to receiver 28. It relays further signals L, obtained therefrom, to electronics 30 which triggers illumination device 24 as a function of the operating points.

For example, the calibration process of control element 22 may be carried out upon each activation of rain sensor 10. Since the optical properties of the light conductor change only slowly, this is adequate, given sufficient frequency of precipitation. In principle, however, intervals I and T are completely independent, and therefore do not have to be either constant or identical. If control element 22 is not constantly active, rain sensor 10 may also store its last calibration parameter K, and upon activation of control element 22, may transmit it to it. The specific embodiment shown in FIG. 2 functions according to the same principle. Since here, however, the light from transmitter 14 does not have to be totally reflected at the outside of window 18, the need for the reference wiping in response to the activation is eliminated.

Figure 4:
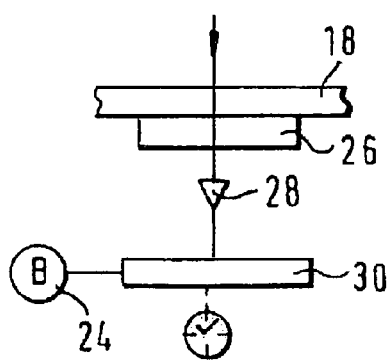
FIG. 4 shows a further variation of a device according to the present invention.

In one very simple design as shown in FIG. 4, the optical properties of light-conducting member 26 may also be determined approximately only from the service life. To that end, electronics 30 receives a time or date signal, and in accordance with it, with increasing age, shifts the operating points to a higher sensitivity. The magnitude of this shift may be determined, for example, from empirical values or model calculations.

In a variation, it is also conceivable to provide electronics 30 with a summator which totals the quantity of light fallen on light-conducting member 26 during the history of the control element. Typically, the properties of plastics, and consequently also their transmission properties, change due to exposure to sunlight. However, the light irradiation is continually measured by receiver 28, and in this way, conclusions may be drawn about the transmission properties of the light conductor. Using this data, the operating points may then be altered, and therefore a calibration may be carried out. A memory cell in combination with a capacitor may be used as summator, the memory cell being incremented when a defined voltage level is exceeded at the integrating capacitor, and it is thereupon discharged. In the simplest case, it is possible to use only a capacitor as summator.

In principle, a calibration of a control element for the automatic control of illumination devices 24 may also be achieved in that, at specific intervals, light of defined intensity and frequency is irradiated through windshield 18 and light-conducting member 26 onto further receiver 28, the signal emitted by further receiver 28 being used by electronics 30 for shifting the operating points. To that end, electronics 30 must be switched into a programming mode which, for example, may be achieved by a defined pulsed irradiation into receiver 28. This defined irradiation may be of a digital nature and correspond to a type of code. Therefore, the entire programming of control element 30 may be carried out on the basis of the incident light in further receiver 28, which means no further switching, trimming or connector elements are necessary on control element 30. If control element 30 has a plurality of receivers 28, then naturally the most varied combinations of lighting may also be used for the programming.

Of course, it is also possible to program the electronics of rain sensor 10 in this manner.

What is claimed is:

1. A method for automatically controlling at least one illumination device, comprising:
    acting on the at least one illumination device by a control element;
    calibrating the control element at first time intervals;
    for the first time intervals, accounting for calibration parameters by a rain sensor;
    calibrating the rain sensor at second time intervals;
    conducting light from a transmitter of the rain sensor via a first light-conducting member of the rain sensor into a receiver of the rain sensor;
    emitting by the receiver a plurality of signals as a function of the light received at the receiver;
    comparing a setpoint value to the plurality of signals; and
    calibrating the rain sensor as a function of a result of the comparing.

2. The method as recited in claim 1, further comprising:
    determining a transmittance from the result of the comparing; and
    calibrating the control element in accordance with the transmittance.

3. The method as recited in claim 2, wherein:
    the control element includes a second light-conducting member;
    optical properties of the second light-conducting member are in correlation with the transmittance; and
    the correlation is taken into account in the control element calibration.

4. The method as recited in claim 3, wherein the correlation is stored as a functional cohesion in the control element.

5. The method as recited in claim 3, wherein the correlation is stored as a table in the control element.

6. The method as recited in claim 1, wherein the at least one illumination device is arranged in a motor vehicle.

7. A device for automatically controlling at least one external illumination device, comprising:
    a rain sensor including a calibration module; and
    a control element for calibrating the device in accordance with at least one calibration parameter of the rain sensor;
    wherein the rain sensor includes:
        at least one transmitter for radiating light;
        a first light-conducting member; and
        a receiver which receives light from the at least one transmitter and emits transmission-dependent signals as a function of the light received, wherein the calibration module emits at least one result which is a function of a transmission of the first light-conducting member.

8. The device as recited in claim 7, wherein the control element includes:
    a further receiver; and
    a second light-conducting member, wherein optical properties of the second light-conducting member are in correlation with the at least one result of the calibration module, wherein the control element accounts for the correlation in calibrating the device.

9. The device as recited in claim 8, wherein the correlation is stored in the control element as a functional cohesion.

10. The device as recited in claim 8, wherein the correlation is stored in the control element as a cohesion in table form.

11. The device as recited in claim 8, wherein the first light-conducting member and the second light-conducting member are constructed in one piece.

12. The device as recited in claim 7, wherein:
    the rain sensor includes a first electronics; and
    the control element includes a second electronics, the first electronics and the second electronics arranged in one piece.

13. The device as recited in claim 12, wherein the one piece is arranged on a board.

* * * * *

UNITED STATES PATENT AND TRADEMARK OFFICE
CERTIFICATE OF CORRECTION

PATENT NO. : 6,800,959 B2
DATED : October 5, 2004
INVENTOR(S) : Wolfgang Herrmann It is certified that error appears in the above-identified patent and that said Letters Patent is hereby corrected as shown below:

Title page,
Item [57], ABSTRACT,
Line 2, change "devices (24)," to -- devices, --
Line 3, delete "(22) (24)"
Line 4, change "time intervals (T)," to -- time intervals, --

Column 1,
Line 4, insert heading and text -- FIELD OF THE INVENTION
The present invention relates to a method and a device for the automatic control of illumination devices, particularly of a motor vehicle. --
Line 6, change "The present ... and a device" to -- Methods --
Lines 7-10, change "devices, particularly ... –but they" to -- devices are described, for example, in German Published Patent No. 195 23 262. Other methods --
Line 15, change "characteristic results" to -- characteristic may result --
Lines 17-18, change "having the features of the main claim" to -- may have --
Line 22, change "advantage is yielded" to -- advantage may be yielded --
Line 23, change "which is likewise calibrated" to -- which likewise may be calibrated --
Line 26, change "are frequently arranged" to -- may be --
Line 27, change "result is that" to -- result may be that --
Line 28, change "proceeds in a similar or really" to -- may proceed in a similar or --
Lines 30-32, delete "The measures specified . . . the main claim."
Line 33, change "It is advantageous" to -- It may be advantageous --
Line 34, change "member; the receiver" to -- member. The receiver --
Line 35, change "receives the light" to -- may receive the light --
Line 36, change "and compares" to -- and may compare --
Line 37, change "In this way," to -- In this manner, --
Line 37, change "properties are" to -- properties may be --
Line 38, change "which means" to -- which may mean that --
Line 42, change "as result from the comparison of" to -- as a result of comparing --
Line 43, change "control element is" to -- control element may be --
Line 44, change "since it is" to -- since it may be --
Line 45, change "operating point" to -- operating point (i.e., the threshold) --
Line 51, change "In this way," to -- In this manner, --
Line 53, change "device, in particular" to -- device, and in particular --
Lines 59-60, delete "advantageously"
Line 64, change "are minimized" to -- may be minimized --
Line 65, change "calibration can then" to -- calibration may then --
Line 65, delete "very"

UNITED STATES PATENT AND TRADEMARK OFFICE
CERTIFICATE OF CORRECTION

PATENT NO. : 6,800,959 B2
DATED : October 5, 2004
INVENTOR(S) : Wolfgang Herrmann It is certified that error appears in the above-identified patent and that said Letters Patent is hereby corrected as shown below:

Column 2,
Line 1, change "it is particularly advantageous" to -- it may be advantageous --
Line 7, change "it is possible" to -- it may be possible --
Line 11, change "is given" to -- may be given --
Line 17, change "is possible" to -- may be possible --
Line 19, change "it is advantageous" to -- it may be advantageous --
Line 19, change "to in each case construct" to -- to construct in each case --
Lines 23-24, change "having the features of claim 10 has" to -- may have --
Line 24, change "it is thereby possible" to -- it may thereby be possible --
Line 27, change "or of the receivers." to -- or for aging effects of the receivers. --
Line 27, change "It is" to -- It may be --
Line 30, change "It is particularly advantageous" to -- It may be particularly advantageous --
Line 34, change "Transmission properties are" to -- Transmission properties may be --
Line 40, change "advantageously results." to -- may advantageously result. --
Line 42, change "it is possible" to -- it may be possible --
Lines 42-43, Change "every correlation" to -- every correlation, representable as function, --
Line 45, change "and control element representable as function." to -- and control element. --
Line 46, change "is advantageously also stored" to -- may advantageously also be stored --
Line 52, change "properties results," to -- properties may result, --
Line 53, change "That is" to -- That may be --
Line 54, change "plastics are" to -- plastics may be --
Line 59, change "saves costs" to -- may save costs --
Line 60, change "It is also advantageous" to -- It may also be advantageous --
Line 62, change "which is a function" to -- which may be a function --
Line 63, change "or even" to -- and possibly --
Line 64, change "which typically are" to -- which may be --
Line 65, change "are to a high degree" to -- may to a high degree be --
Line 66, change "which means" to -- which may mean that --
Line 67, change "service life represents" to -- service life may represent --

UNITED STATES PATENT AND TRADEMARK OFFICE
CERTIFICATE OF CORRECTION

PATENT NO. : 6,800,959 B2
DATED : October 5, 2004
INVENTOR(S) : Wolfgang Herrmann It is certified that error appears in the above-identified patent and that said Letters Patent is hereby corrected as shown below:

Column 3,
Line 1, change "It is also" to -- It may be also --
Line 10, change "... of the Drawing" to -- ... of the Drawings --
Lines 11-13, delete "Exemplary embodiments ... following description."
Line 14, change "shows a device of" to -- shows a device according to an exemplary embodiment of --
Line 15, change "representation;" to -- representation. --
Line 16, change "according to the" to -- according to another exemplary embodiment of the --
Line 17, change "invention;" to -- invention. --
Line 19, change "shows method steps" to -- shows a flow chart --
Line 19, change "of a method" to -- of a method according to an exemplary embodiment --
Line 20, change "schematic representation;" to -- schematic representation. --
Line 21, change "device according to" to -- device according to another exemplary embodiment of --
Line 24, change "Description of the Exemplary Embodiments" to -- Detailed Description --
Line 26, change "FIG. 1 shows a device" to -- FIG. 1 shows an exemplary embodiment of a device --
Line 27, change "It has" to -- It may have --
Line 30, change "sensor 10 functions" to -- sensor 10 may function --
Line 31, change "transmitter 14 sends" to -- transmitter 14 may send --
Lines 32-33, change "typically the windshield" to -- which may be the windshield --
Line 34, change "The light penetrates" to -- The light may penetrate --
Line 35, change "and is totally reflected" to -- and may be totally reflected --
Lines 35-36, change "window 18, facing away ... member 16," to -- window 18 (facing away from first light-conducting member 16) --
Line 37, change "provided it is not wet" to -- provided window 18 is not wet --
Line 38, change "light in turn travels" to -- light may in turn travel --
Line 39, change "20 thereupon emits" to -- 20 may thereupon emit --
Line 43, change "module 12 performs a" to -- module 12 may perform a --
Line 46, change "element 22 is used" to -- element 22 may be used --
Line 47, change "ambient light gets" to -- ambient light may get --
Line 48, change "member 26, arriving at" to -- member 26 and arrive at --
Line 49, change "It is connected to" to -- Further receiver 28 may be connected to --
Line 50, change "element 22 which evaluates its signal and," to -- element 22, which may evaluate the signals from further receiver 28 and, --
Line 51, change "controls illumination devices 24." to -- may control illumination devices 24. --
Line 52, change "electronics 22 are so-called" to -- electronics 30 may be --

UNITED STATES PATENT AND TRADEMARK OFFICE
CERTIFICATE OF CORRECTION

PATENT NO. : 6,800,959 B2
DATED : October 5, 2004
INVENTOR(S) : Wolfgang Herrmann It is certified that error appears in the above-identified patent and that said Letters Patent is hereby corrected as shown below:

Column 3 (cont'd),
Line 53, change "which in each case correspond" to -- which in each case, may correspond --
Lines 56-57, change "are triggered, that is to say, are switched on or off or are dimmed." to -- may be triggered (i.e., they may be switched on, switched off, or dimmed). --
Line 58, change "members 16, 18" to -- members 16, 26 --
Line 59, delete "naturally"
Line 59, change "In the same way," to -- Similarly --
Line 60, change "same board of" to -- same board as --
Line 63, change "FIG. 2 shows a variation of" to -- FIG. 2 shows another exemplary embodiment of --
Line 64, change "In this case," to -- In FIG. 2, --
Line 65, change "is transmitted" to -- may be transmitted --

Figure 3:
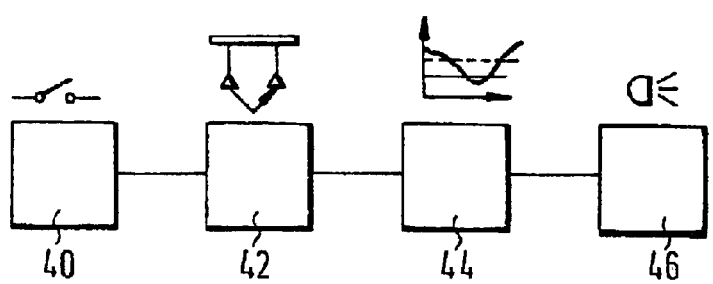
FIG. 3 shows method steps of a method of the present invention in schematic representation.

Column 4,
Line 2, change "30 thereupon performs" to -- 30 may thereupon perform --
Line 2, change "This alters" to -- This may alter --
Line 3, change "or amplifies" to -- or may amplify --
Line 5, change "In the following," to -- In FIG. 3, --
Line 5, change "of the device of" to -- of a device according to an exemplary embodiment of --
Line 7, change "are clarified." to -- are discussed. --
Line 8, change "is activated." to -- may be activated. --
Line 8, change "Using its" to – Using --
Line 9, change "it thereupon sends" to -- rain sensor 10 may thereupon send --
Line 10, change "and sees to it that" to -- and may ensure that --
Line 11, change "clean (i.e., is free of dirt and precipitation." to -- clean (i.e., is free of dirt and precipitation). --
Lines 12-13, change "in that the rain sensor drives" to -- by rain sensor 10 driving --
Line 13, change "thus carries out" to -- thus carrying out --
Line 14, change "wiping using washer fluid, if desired." to -- wiping, and possibly using washer fluid. --
Line 15, change "light which was" to -- light which may be --
Line 16, change "is detected" to -- may be detected --
Lines 16-17, change "It thereupon emits" to -- Receiver 20 may thereupon emit --
Line 18, change "10, the calibration module then carries out" to -- 10. Calibration module 20 may then carry out --
Line 20, change "window 18 is free" to -- window 18 may be free --
Line 21, change "signal S is determined" to -- signal S may be determined --

UNITED STATES PATENT AND TRADEMARK OFFICE
CERTIFICATE OF CORRECTION

PATENT NO. : 6,800,959 B2
DATED : October 5, 2004
INVENTOR(S) : Wolfgang Herrmann It is certified that error appears in the above-identified patent and that said Letters Patent is hereby corrected as shown below:

Column 4 (cont'd),
Line 23, change "Because as a rule," to -- Since --
Lines 23-24, change "is made of" to -- may be made of --
Lines 24-25, change "represents first and foremost" to -- may represent --
Line 26, change "In this way," to -- In this manner,
Line 27, change "which need be neither constant nor" to -- which may not be constant or --
Line 28, change "is able to be" to -- may be able to be --
Line 30, change "are utilized" to -- may be utilized --
Line 32, change "are triggered" to -- may be triggered --
Line 34, change "95 percentage" to -- 95 percent --
Line 36, change "5 percentage" to -- 5 percent --
Line 42, change "is stored" to -- may be stored --
Line 43, change "may be made of" to -- may be composed of --
Line 45, change "device is activated" to -- device may be activated --
Line 47, change "are triggered." to -- may be triggered. --
Line 48, change "light travels" to -- light may travel --
Line 49, change "It relays" to -- Receiver 28 may relay --
Line 51, change "triggers illumination device" to -- may trigger illumination device --
Line 56, change "this is adequate," to -- this may be adequate, --
Line 57, change "I and T are" to -- I and T may be --
Line 62, change "may transmit to it. The specific" to -- rain sensor 10 may transmit its last calibration parameter K to control element 22. The exemplary --
Line 63, change "functions according to" to -- may function according to --
Line 64, change "Since here," to -- In the exemplary embodiment shown in FIG. 2, --
Line 65, change "window 18, the" to -- window 18, and therefore the --
Lines 66-67, change "is eliminated" to -- may be eliminated

UNITED STATES PATENT AND TRADEMARK OFFICE
CERTIFICATE OF CORRECTION

PATENT NO. : 6,800,959 B2
DATED : October 5, 2004
INVENTOR(S) : Wolfgang Herrmann It is certified that error appears in the above-identified patent and that said Letters Patent is hereby corrected as shown below:

Column 5,
Line 1, change "In one very simple design as shown" to -- In the exemplary embodiment shown --
Line 3, delete "only"
Line 4, change "electronics 30 receives" to -- electronic 30 may receive --
Line 5, change "shifts the operating" to -- may shift the operating --
Line 9, change "In a variation, it is also conceivable" to -- In another exemplary embodiment it may also be conceivable --
Line 12, change "Typically, the properties" to -- The properties --
Line 13, change "properties, change due" to -- properties, may change due --
Line 14, change "irradiation is" to -- irradiation may be --
Line 15, change "in this way" to -- in this manner --
Line 28, change "is irradiated" to -- may be irradiated --
Line 32, change "electronics 30 must be" to -- electronics 30 may be --
Line 36, change "control element 30" to -- control element 22 --
Line 38, change "which means" to -- which may mean --
Line 39, change "control element 30." to -- control element 22. --
Line 40, change "control element 30" to -- control element 22 --
Line 43, change "Of course, it is also possible" to -- It may also be possible --

Signed and Sealed this

Twelfth Day of July, 2005

JON W. DUDAS
*Director of the United States Patent and Trademark Office*